3,380,774
MOUNTING FOR SAFETY CANOPIES
Edward M. Brodersen, Monterey Park, and Roger D. Hopfensperger, Alhambra, Calif., assignors to Southwest Welding & Manufacturing Co., Alhambra, Calif., a corporation of California
Filed Dec. 23, 1966, Ser. No. 604,227
2 Claims. (Cl. 296—102)

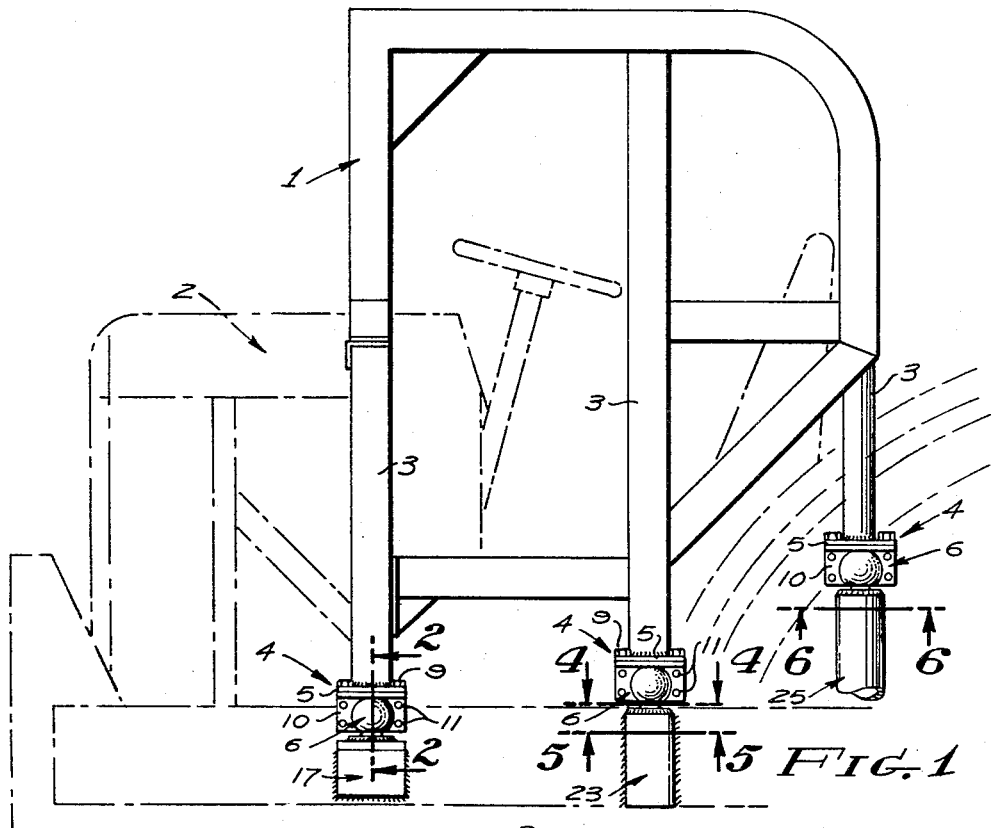
Fig. 1
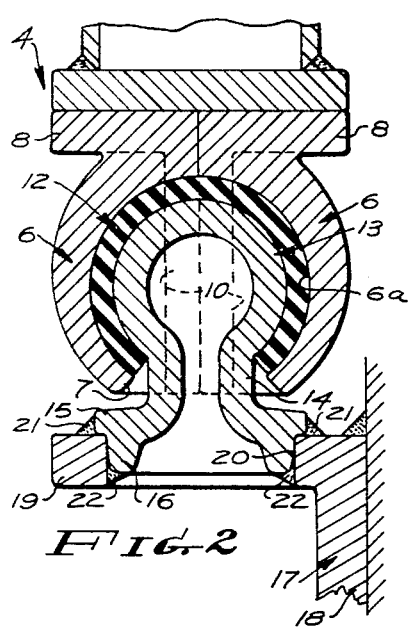
Fig. 2
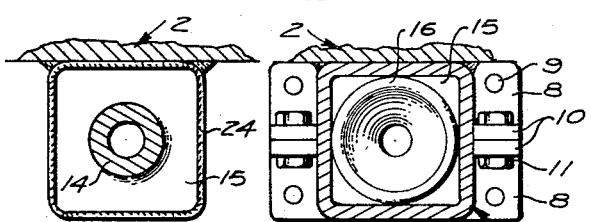
Fig. 4   Fig. 5
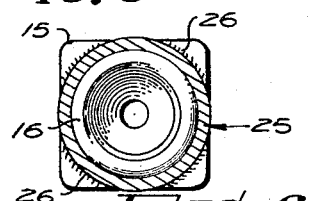
Fig. 6
Fig. 3
EDWARD M. BRODERSEN
Roger D. Hopfensperger
INVENTORS
BY
ATTORNEYS United States Patent Office 3,380,774
Patented Apr. 30, 1968

ABSTRACT OF THE DISCLOSURE

A ball and socket mounting having means for weld attachment to brackets of various shapes, which are in turn welded to various parts of a tractor or other earth moving equipment for the purpose of supporting a canopy or roll bar frame intended to protect the operator in the event of roll over, yet providing limited relative racking or flexure of the canopy and the tractor or the like on which it is mounted.

This invention relates to guard canopies which are customarily installed on track-laying or rubber tired tractors when the tractors are employed under such conditions or in such locations that guard canopies are necessary for protecting the operator of the tractor against falling timbers, trees, etc., or for protection against injury from the over-turning of the tractor.

Such tractor guard canopies customarily comprise strong rigid frame structures including four vertical posts integrally connected at the top by longitudinal and transverse frame members, which in turn support a suitable top cover structure extending over the driver's location. The main frames of such tractor guard canopies generally are formed from metal tubing so as to give the necessary strength and rigidity to the frame in comparison to the amount of metal used, the metal tubing being either circular or, preferably, square in cross section.

However, due to the fact that some flexing or twisting of the tractor frame necessarily occurs from time to time as the heavy tractor passes over rough ground and encounters obstacles, in spite of the fact that the tractor frame is substantially rigid, such relative movements between different portions of the tractor frame are then transmitted to the corresponding portions of the guard canopy frame through the customary rigid unyielding connections between canopy frame and tractor body. This explains why failures and breaks in certain parts of such guard canopy frames are common occurrence after a period of use with the tractor.

Since the flexing which may take place in the tractor frame, and which would ordinarily be transmitted to the guard canopy frame, could occur in any direction, a related specific object of the invention is to provide improved mounting means which will accommodate and absorb limited relative movements in any and all directions between the connected parts in such mounting means while still holding the guard canopy frame firmly in position on the tractor.

A typical example of previous attempts to solve this problem is shown in Patent 3,036,858, issued May 29, 1962.

The objects of the present invention include:

First, to provide a means whereby a roll bar canopy or frame may be readily and removably installed on the wide variety of special use tractors and earth moving equipment, the mounting means being easily adapted for weld attachment to whatever kind or type of support a particular piece of equipment may provide, all with a minimum of alteration, if any, of the equipment.

Second, to provide a mounting means which includes a ball journal having a mounting base arranged for attachment to round or square tubing, or to brackets in which accommodation openings have been torch cut.

Third, to provide a novelly arranged ball and socket joint which permits limited universal racking of the tractor and roll bar canopy, and which is inherently strong to withstand the excessive loads as may be applied to the canopy or tractor.

With the above and other objects in view, as may appear hereinafter, reference is now directed to the accompanying drawings in which:

FIGURE 1 is a side view of a typical canopy, equipped with several of the canopy mountings, and various means for securing the mountings to a tractor, the tractor being indicated in broken outline and fragmentarily.

FIGURE 2 is an enlarged fragmentary sectional view, taken through 2—2 of FIGURE 1.

FIGURE 3 is a bottom view of the ball member, showing particularly the mounting base.

FIGURE 4 is an enlarged fragmentary sectional view, taken through 4—4 of FIGURE 1.

FIGURE 5 is a fragmentary sectional view, taken through 5—5 of FIGURE 1.

FIGURE 6 is a fragmentary sectional view, taken through 6—6 of FIGURE 1.

The present invention is intended to facilitate installation of a roll bar canopy or frame 1, on a tractor 2. The term tractor is used in its broad sense, and is intended to include tractors having pneumatic wheels or endless tracks, whether used for agricultural work or road building or other earth moving applications. It also includes special equipment which might not ordinarily be termed a tractor, but which carry an operator and are self-propelled.

The canopy may take various forms, but in any case, it is mounted over the driver's or operator's compartment, and includes vertical bars 3, or angularly directed bars, which extend to appropriate locations on the tractor, to which supporting means may be welded, and to which may be welded the mounting means indicated by 4, which constitutes the primary phase of this invention.

More particularly, each bar 3 terminates in a bottom plate 5, which may be square or rectangular. Each bottom plate is adapted to be secured to a pair of complementary socket members 6. Together, a pair of socket members define a spherical socket 6a occupying a region substantially greater than a hemisphere. In other words, forming an opening 7, of smaller diameter than the diameter of the sphere defined by the socket members.

The upper or closed sides of the socket members are joined to complementary flange plates 8, which are co-planar. The flange plates 8 are also co-extensive with the bottom plates 5, and the corner portions of the bottom plates 5, and flange plates 8, are apertured to receive mounting bolts 9.

The confronting sides of the socket members are provided with laterally extending abutting vertical flanges 10, which are secured together by bolts 11.

Each pair of socket members 6 receives a liner 12 which covers the inner walls thereof. The liner is formed of rubber or other suitable elastomer. Each liner receives a ball member 13, formed on the end of a short neck 14, which in turn is joined to a flange 15. The flange 15 is square with round corners, as shown best in FIGURE 3. Depending from the flange 15 is a circular flange or skirt 16 of smaller diameter. The ball member 13, neck 14, and central portions of the flanges 15 and 16, are preferably hollow, as shown best in FIGURE 2.

By reason of the fact that tractors vary materially in their dimensions, and in their structural components, it is essential that the mounting means be capable of attachment by welding to a wide variety of brackets or tubular elements, forming an integral part of the tractor, or in turn being welded to the tractor. One such means is illustrated in FIGURE 2. In this case, an L-shaped bracket 17 is employed, the vertical side 18 of which is welded to the tractor, and the horizontal side 19 extends outwardly therefrom and is provided with a circular aperture 20, which may be cut by a torch to the approximate dimensions of the circular flange or skirt 16. The ball member is attached by inserting the flange 16 into the aperture 20, and then joining the margins of the flange 15 by a top weld 21, and the margins of the flange 16 by a bottom weld 22.

The ball member may be attached to a square tube 23, forming a part of or welded to the tractor. It is preferred that the tube 23 have an inside diameter corresponding to the diameter of the flange 16, and an outside diameter slightly greater than the flange 15. In this case, the top flange may be welded to the square tube by a top weld 24, as shown in FIGURE 4.

The ball member may be also attached to a circular tube 25, dimensioned to receive the flange 16. In this case, the corner portions of the flange 15 protrude beyond the circular tube and provide areas whereby the flange 15 may be attached to the end of the circular tube 25 by a bottom weld 26.

Irrespective of the manner in which the ball member 13 is attached to the tractor, the liners 12 permit limited relative racking of the canopy and the tractor without placing undue strain to the frame members comprising the canopy or to the structural parts of the tractor or to the ball and socket connection therebetween.

Installation or removal of the canopy is readily accomplished by removing the bolts 9 or the bolts 11.

While particular embodiments of this invention have been shown and described, it is not intended to limit the same to the details of the constructions set forth, but instead, the invention embraces such changes, modifications and equivalents of the various parts and their relationships as come within the purview of the appended claims.

We claim:

1. A mounting means for attachment of a roll bar canopy or frame to a tractor, wherein the frame has a plurality of essentially vertical bars intended for attachment to the tractor, and the tractor has a plurality of attachment fixtures located in opposing relation to said bars, each of said mounting means comprising:

(a) a mounting ball structure including a ball element, a neck extending therefrom, and a base joined to said neck;
  (b) said base including a rectangular upper portion having margins for weld connection to a surrounding rectangular surface of an attachment fixture, and a depending circular portion having margins for weld connection to a surrounding circular surface;
  (c) a pair of complementary socket forming members arranged for removable attachment to the corresponding bar of said canopy and also arrange for removable attachment to each other;
  (d) and a yieldable cushion interposed between said ball member and said socket forming members.

2. A mounting means for attachment of a roll bar canopy or frame to a tractor, wherein the frame has a plurality of essentially vertical bars intended for attachment to the tractor, and the tractor has a plurality of attachment fixtures located in opposing relation to said bars, each of said mounting means comprising:

(a) a mounting ball structure including a ball element, a neck extending therefrom, and a base joined to said neck;
  (b) a pair of complementary socket forming members including a first pair of confronting flanges defining a plane passing centrally through said ball member and its base, and a second pair of complementary flanges defining a plane perpendicular to the plane defined by said first pair of flanges;
  (c) means for joining said first pair of flanges to each other;
  (d) means for joining said second pair of flanges to a corresponding bar of said canopy;
  (e) and a yieldable cushion interposed between said ball member and said socket forming members.

References Cited

UNITED STATES PATENTS 3,036,858   5/1962   Finerut _____ 296—102
3,210,103   10/1965  Montgomery et al. ____ 287—21

BENJAMIN HERSH, *Primary Examiner.*

R. SONG, *Assistant Examiner.*